(12) United States Patent
Schnoor et al.

(10) Patent No.: US 9,088,146 B2
(45) Date of Patent: Jul. 21, 2015

(54) MODULAR HOLDING DEVICE FOR MOUNTING PARTS LOCATED INSIDE AN AIRCRAFT FUSELAGE

(75) Inventors: Martin Schnoor, Kaltenkirchen (DE); Lueder Kosiankowski, Harsefeld (DE)

(73) Assignee: Airbus Operations GmbH (DE)

( * ) Notice: Subject to any disclaimer, the term of this patent is extended or adjusted under 35 U.S.C. 154(b) by 701 days.

(21) Appl. No.: 12/771,081

(22) Filed: Apr. 30, 2010

(65) Prior Publication Data
US 2010/0282937 A1 Nov. 11, 2010

Related U.S. Application Data

(60) Provisional application No. 61/174,360, filed on Apr. 30, 2009.

(30) Foreign Application Priority Data

Apr. 30, 2009 (DE) .......................... 10 2009 019 337

(51) Int. Cl.
A47B 96/00 (2006.01)
H02G 3/32 (2006.01)
(52) U.S. Cl.
CPC ....................................... H02G 3/32 (2013.01)
(58) Field of Classification Search
USPC ........ 248/225.21, 229.1, 49, 62, 64, 65, 68.1, 248/72, 74.1, 75, 67, 73, 74.2, 664, 70, 248/74.3, 67.7, 316.1, 316.6; 174/72 A, 135
See application file for complete search history.

(56) References Cited

U.S. PATENT DOCUMENTS

| 3,501,117 | A | * | 3/1970 | Soltysik ........................... 248/71 |
| 3,536,281 | A | * | 10/1970 | Attore et al. .................... 248/73 |
| 3,735,950 | A | * | 5/1973 | Paintin ............................ 248/62 |
| 5,725,185 | A | * | 3/1998 | Auclair ......................... 248/74.2 |
| 5,950,970 | A | * | 9/1999 | Methany et al. .............. 248/150 |
| 6,105,907 | A | * | 8/2000 | Komsitsky ...................... 248/71 |
| 6,206,331 | B1 | * | 3/2001 | Keith et al. ................... 248/74.1 |
| 6,708,931 | B2 | * | 3/2004 | Miura .......................... 248/68.1 |
| 6,875,916 | B2 | * | 4/2005 | Winkelbach et al. ......... 174/482 |
| 6,994,300 | B2 | | 2/2006 | Labeirie et al. |
| 7,090,174 | B2 | * | 8/2006 | Korczak et al. ................. 248/61 |
| 7,290,739 | B2 | * | 11/2007 | Zeuner et al. ................ 248/68.1 |
| 7,448,579 | B2 | * | 11/2008 | Kwilosz et al. ................. 248/71 |
| 7,467,767 | B2 | * | 12/2008 | Miles et al. .................. 248/74.1 |
| 7,533,853 | B2 | * | 5/2009 | Ogawa .......................... 248/74.1 |
| 7,784,745 | B2 | * | 8/2010 | Dodge ............................ 248/73 |

(Continued)

FOREIGN PATENT DOCUMENTS

| DE | 3820290 A1 | 12/1989 |
| DE | 20003081 U1 | 4/2000 |

(Continued)

*Primary Examiner* — Monica Millner
(74) *Attorney, Agent, or Firm* — Lerner, David, Littenberg, Krumholz & Mentlik, LLP

(57) ABSTRACT

A holding device for a mounting part installed inside an aircraft fuselage includes an anchor plate configured to attach the holding device to a support rail of the aircraft fuselage and including at least one engagement section. The holding device further includes a holder module separably connected to the anchor plate and configured to fix the mounting part to the aircraft fuselage and having a hook section configured to positively engage the at least one engagement section so as to fasten the holder module to the anchor plate, and at least two clamping blocks disposed on the holder module.

14 Claims, 4 Drawing Sheets

(56) References Cited

U.S. PATENT DOCUMENTS

| | | | |
|---|---|---|---|
| 8,291,551 B2 * | 10/2012 | Bruss et al. | 24/16 R |
| 2003/0183413 A1 * | 10/2003 | Kato | 174/135 |
| 2005/0196121 A1 | 9/2005 | Lohr et al. | |
| 2005/0242245 A1 * | 11/2005 | Balderama et al. | 248/65 |
| 2006/0272848 A1 * | 12/2006 | Guthke et al. | 174/135 |
| 2007/0251714 A1 | 11/2007 | Winkelbach et al. | |
| 2008/0173773 A1 * | 7/2008 | Opperthauser | 248/74.1 |
| 2009/0072098 A1 * | 3/2009 | Smallhorn | 248/68.1 |
| 2012/0219301 A1 * | 8/2012 | Koch et al. | 398/142 |

FOREIGN PATENT DOCUMENTS

| | | |
|---|---|---|
| DE | 102004009967 A1 | 9/2005 |
| DE | 102004045964 A1 | 4/2006 |
| WO | WO 2009040566 A1 | 4/2009 |

* cited by examiner

MODULAR HOLDING DEVICE FOR MOUNTING PARTS LOCATED INSIDE AN AIRCRAFT FUSELAGE

Priority is claimed to German Application No. DE 10 2009 019 337.5, filed Apr. 30, 2009, and U.S. Provisional Application No. 61/174,360, filed Apr. 30, 2009. The entire disclosure of both applications is incorporated by reference herein.

The present invention pertains to a holding device for mounting parts installed inside an aircraft fuselage, comprising an anchor plate for being attached to a support rail of the aircraft fuselage that is separably connected to a holder module for fixing the mounting part in the aircraft fuselage, wherein the anchor plate features at least one engagement section that serves for positively fastening the holder module and on which a complementarily designed first hook section on the holder module positively engages.

The field of application of the present invention is related to aircraft engineering. Numerous conduits and electrical lines that are bundled into cable harnesses extend inside aircraft cabins. In order to stationarily fasten such mounting parts on the aircraft cabin, holding devices are used that fix the mounting parts on the aircraft fuselage along the desired direction. Fuselage frames serve for the attachment on the aircraft fuselage, wherein such a fuselage frame forms a support rail of sorts for the holding device and usually is detachably fastened thereon by means of a screw connection. Holding devices of the interesting type in this context may, depending on the intended use, either be realized in a rail-like or channel-like fashion.

BACKGROUND

DE 10 2904 045 964 A1 discloses a channel-like holding device that essentially consists of a rail-shaped anchor plate that is screwed to the frame region of the aircraft fuselage and closed with a cover that forms a holder module for mounting parts such that a chambered channel for accommodating mounting parts in the form of different parallel electric wiring harnesses is created. The cover-like holder module is connected to the rail-like anchor plate by means of a clip-on connection. For this purpose, positively interacting connecting sections are respectively provided in the parallel edge region. Engagement sections are integrally formed onto the holder module and cooperate with corresponding groove sections of the rail-like anchor plate. In addition, similar clip-on connectors are provided on intermediate walls that extend orthogonally to the plane of the anchor plate and form the different parallel chambers of the channel-like holding device.

However, this solution has the disadvantage that the shape of the rail-like anchor plate determines the number of individual chambers available for respectively accommodating one mounting part. For example, if only one cable harness should be installed, the remaining chambers stay empty such that valuable installation space is wasted. On the other hand, if many cable harnesses need to be installed parallel to one another, it is necessary to adjacently screw several of these chamber-like holding devices to the frame that serves as the support rail of the aircraft fuselage such that the resulting installation expenditure is quite high.

DE 10 2004 009 967 A1 discloses another holding device that consists of individual cable holders for being attached to a suitable frame structure of the aircraft fuselage. These holding devices can be pressed into assigned recesses in the support structure and, if so required, fixed therein with an adhesive by means of pins that are integrally formed onto the anchor plate. On the upper side, the anchor plate has an adapter-like shape, to which different holder modules with a corresponding shape on the lower side can be positively connected. Depending on the number of wiring harnesses to be installed parallel to one another, it is possible to utilize holder modules that are correspondingly realized n-times. However, this technical solution is more suitable for rather small-sized mounting parts with smaller diameters.

SUMMARY OF THE INVENTION

An aspect of the present invention includes developing a holding device for mounting parts installed inside an aircraft fuselage that is also suitable for larger mounting parts in order to fix these mounting parts in an arbitrary n-times arrangement and an easily installable fashion.

Based on a holding device according to the preamble of claim 1, this objective is attained in connection with the characteristics disclosed in the characterizing portion of this claim. The ensuing dependent claims describe advantageous additional developments of the invention.

The invention includes the technical characteristic that the holder module also features a pair of clamping blocks that are arranged on the holder module and can be adjusted with the aid of tensioning means in addition to positive connecting means toward the anchor plate, wherein said clamping blocks make it possible to realize a non-positive engagement on the edge region of the support rail by means of their respective contact surfaces that face one another. Alternatively, the clamping blocks may also be equipped with recesses that face one another in order to realize a combined non-positive/positive engagement on the edge region of the support rail.

The advantage of the inventive solution can be seen, in particular, in that only the anchor plate needs to be connected to the support rail of the aircraft fuselage by means of a conventional screw connection and an arbitrary number of holder modules can be adjacently arranged thereon in order to provide n-times the holding devices for mounting parts in the form of conduits or cable harnesses that extend parallel to one another. The other fastening points of the adjacent holder modules are realized with the non-positively or combined non-positively/positively acting clamping blocks. These clamping blocks do not damage the support rail such that the inventive solution does not affect the stability of the support structure of the aircraft fuselage, in particular, regardless of the number of adjacently arranged holder modules. In addition, the inventive solution makes it possible to easily and quickly install different harness widths and different harness thicknesses with the holder modules. Due to the clamping blocks that can be fastened with the aid of the tensioning means, an installation or removal is also possible in the smallest installation space.

According to a first embodiment of the invention, a tensioning screw that extends over the width of the support rail may be used as tensioning means, wherein one of the clamping blocks for being fastened on the support rail is respectively pushed onto the ends of said tensioning screw. For this purpose, at least the end regions of the tensioning screw preferably feature a threaded section that respectively serves for screwing on nuts that press the assigned clamping blocks against the support rails. Alternatively, it is also possible to realize the tensioning screw in the form of a continuous threaded bolt. The nuts used may consist of conventional hexagonal nuts. A particularly simple installation is ensured with wing nuts that can be used without any other tools.

According to a second embodiment, the clamping blocks may also be arranged in an axially movable fashion on a guide rail that positively cooperates with the clamping blocks and is integrally formed onto the holder module, wherein a tensioning means in the form of a detent toothing between the guide rail of the holder module and the assigned clamping block prevents an unintentional movement in the opening direction. The guide rail should preferably have a dovetail profile in order to guarantee a positive fit between the clamping block and the holder module and to simultaneously ensure precise guiding properties.

In connection with a tensioning means in the form of such a detent toothing, it is proposed, according to a measure that improves this embodiment, to connect the two clamping blocks to one another with additional tensioning means in the form of a tension strap. Due to this additional tensioning means, an improved level of protection against the unintentional detachment of the holding device from the support structure is achieved. The tension strap used may in the simplest case consist of a normal cable tie.

In addition to the option of equipping the clamping blocks with simple contact surfaces for being non-positively pressed against the edge region of the support rail, it is proposed to preferably provide the respective clamping blocks with a wedge-shaped recess that engages on the edge region of the support rail in a combined non-positive/positive fashion. In this case, the non-positive component of this fastening arrangement is formed by the pressing force of the clamping block against the guide rail under the influence of the tensioning means while the positive component of the fastening arrangement is formed by the engagement of the edge region into the wedge-shaped recess. This embodiment provides a particularly stable fastening of holder modules on the support rail that is simultaneously protected against unintentional detachment.

In order to realize a modular design, it is proposed that an additional holder module that follows the first holder module due to its adjacent arrangement is positively engaged on the tensioning means of the first holder module. Instead of the engagement on the preceding tensioning means, however, it would also be conceivable to realize a hook section that serves for the desired positive engagement on the preceding holder module. The additional holder module is also fastened on the support rail with the aid of a tensioning means that is preferably realized in accordance with one of the above-described embodiments.

In other respects, it should be noted that the anchor plate positioned first in the adjacently arranged chain preferably is conventionally screwed to the support rail with two screws. In this case, two screws that are spaced apart from one another suffice for achieving a sufficiently correct alignment of the anchor plate relative to the support rail. The anchor plate preferably features engagement sections that are realized in a pin-shaped or hook-shaped fashion for positively coupling the first holder module.

According to another measure that improves the invention, it is proposed that the holder module has a U-shaped cross section for accommodating the mounting parts. The mounting parts such as, for example, conduits or wire harnesses can then be accommodated in the thusly formed channel. It is furthermore proposed to provide the U-shaped holder module with a cover so as to form a channel that is closed in the circumferential direction. The cover may simply be attachable to the holder module means of a clip-on connection. It is proposed to couple the cover to one side of the holder module by means of an integral hinge so as to form a one-piece unit. Alternatively or additionally to the channel-forming cover, it is proposed to additionally fix the mounting part on the holder module with conventional cable ties.

The components anchor plate, holder module and clamping blocks of the inventive holding device can simply be manufactured of plastic by means of injection moulding.

The advantage of realizing such a manufacturing technology is the low net weight one generally strives for in aircraft construction.

BRIEF DESCRIPTION OF THE DRAWINGS

Other measures that improve the invention are discussed in greater detail below together with the description of preferred exemplary embodiments of the invention with reference to the figures. In the drawings.

DETAILED DESCRIPTION

Figure 1:
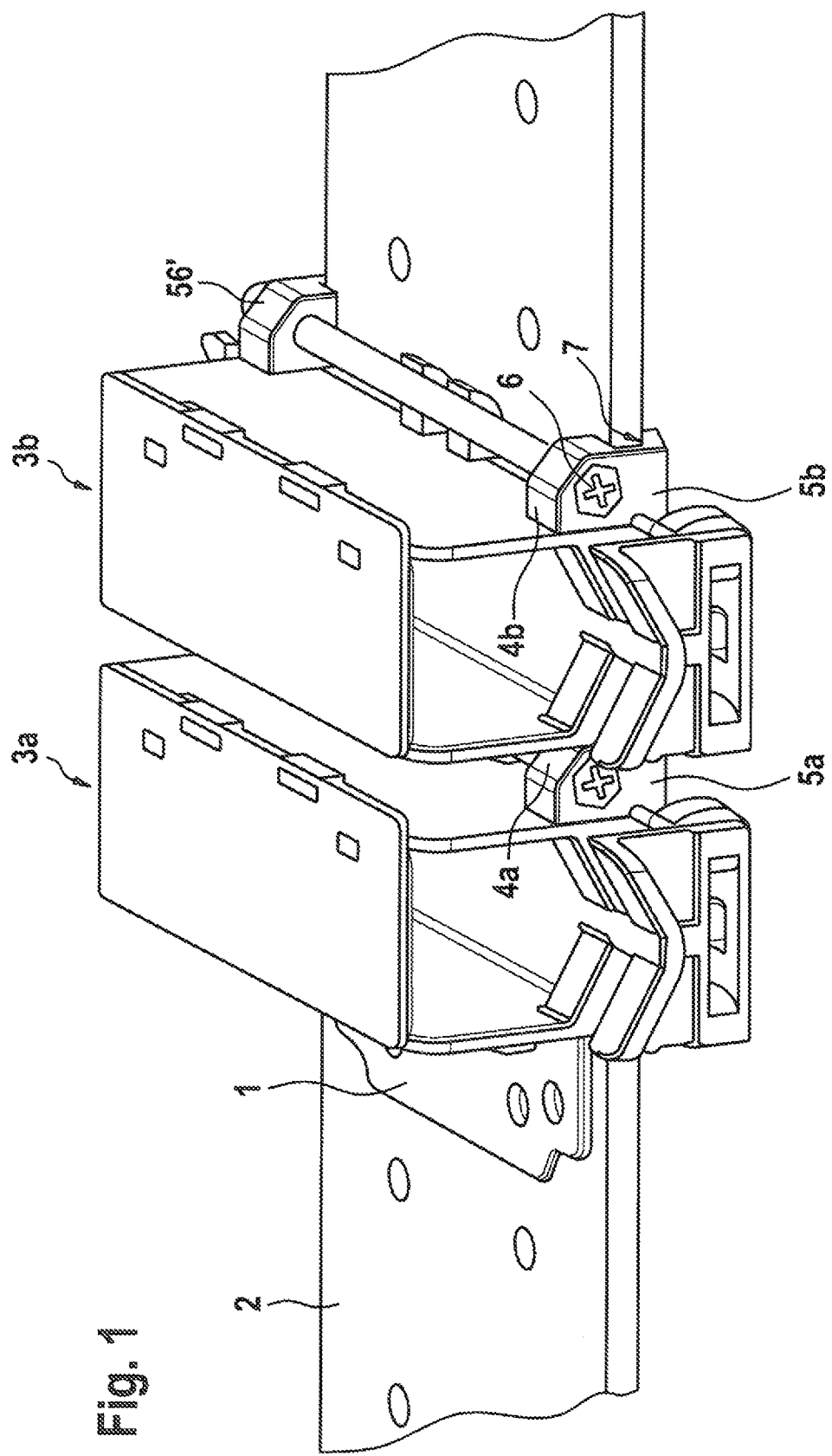
FIG. 1 shows a perspective representation of a holding device with tensioning means according to a first embodiment.

According to FIG. 1, the holding device essentially consists of an anchor plate 1 that is detachably fastened on a support rail 2 by means of several—not-shown—screws. The support rail 2 forms an inside component of the support structure of an aircraft fuselage. A holder module 3a is hooked to the anchor plate 1 and this positive connection is fixed on the support rail 2 on the opposite side of the holder module 3a referred to the anchor plate 1 by means of a tensioning screw 4a with assigned clamping blocks 5a—of which only one is visible—on its ends. In order to realize a modular design, an additional holder module 3b is hooked, i.e., positively connected, to the tensioning screw 4a of the first holder module 3a. The additional holder module 3b is once again assigned a tensioning means in the form of its own tensioning screw 4b that serves for actuating the two clamping blocks 5b and 5b'. For this purpose, the tensioning screw 4b respectively features (for example) a threaded section in the region of both ends, wherein nuts 6 that are respectively screwed onto the threaded sections press (for example) the respectively assigned clamping block 5b; 5b' against the edge region of the support rail 2.

For a combined non-positive/positive engagement on the edge region of the support rail 2, each clamping block 5b features (for example) a recess 7 of wedge-shaped design in order to achieve a stable clamping on the edge region of the support rail 2.

Figure 2:
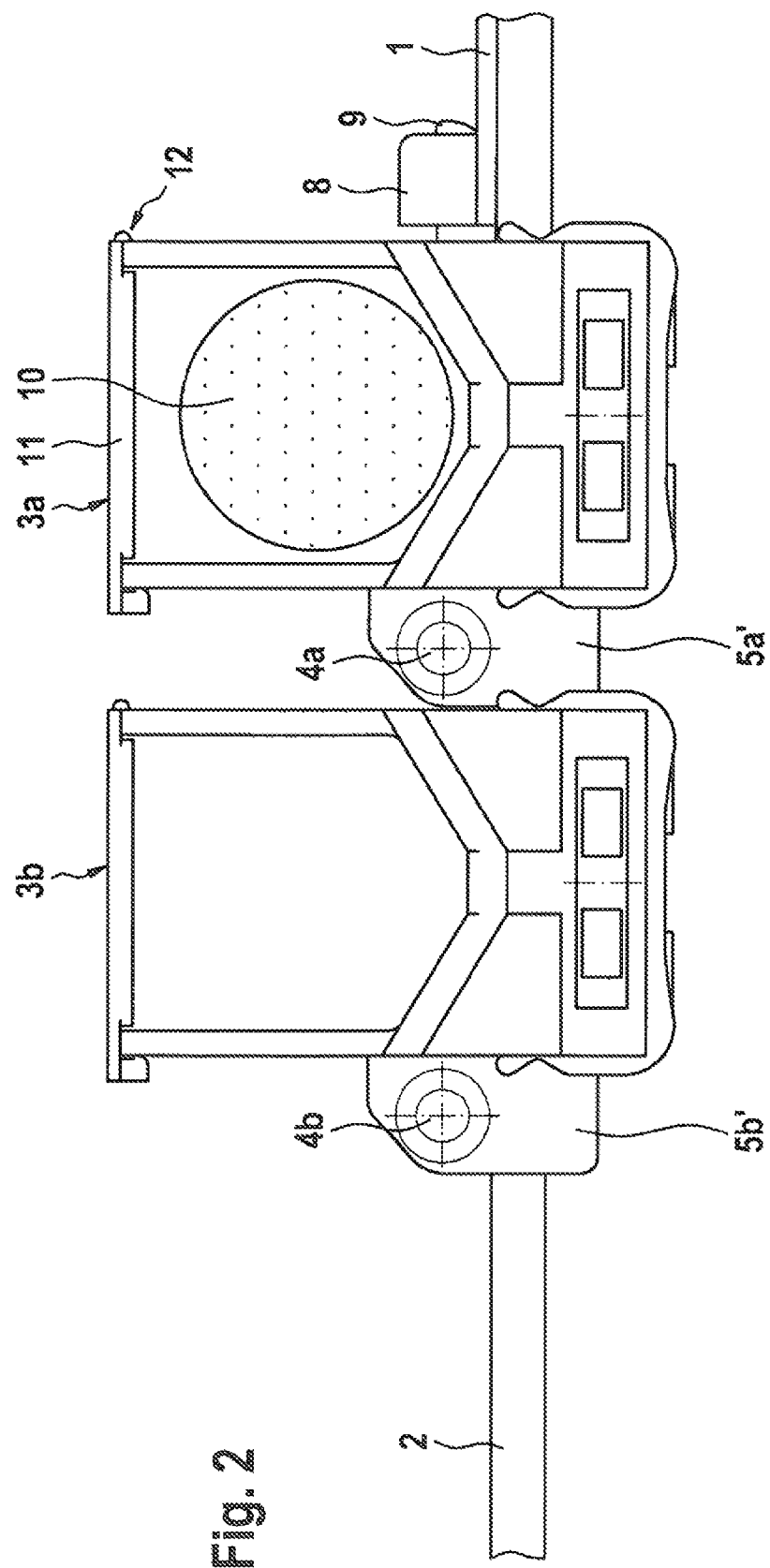
FIG. 2 shows a side view of the holding device of FIG. 1.

The view shown in FIG. 2 makes clear that the modular design is based on the utilization of identical components for the adjacently arranged holder modules 3a and 3b, as well as their tensioning screws 4a and 4b along with the clamping blocks 5a' and 5b'. The anchor plate 1 provided with an engagement section 8 (see FIG. 2) for positively fastening the first holder module 3a is positioned at the beginning of the adjacently arranged chain, wherein a first hook section 9 is integrally formed onto the holder module 3a for this purpose and engages behind a pin-shaped region on the engagement section 8.

In this exemplary embodiment, a mounting part 10 in the form of a cable harness is accommodated in the holder module 3a. The mounting part 10 is accommodated by the essentially U-shaped holder module 3a and a corresponding cover 11 forms a closed channel. The cover 11 is pivotably coupled to the holder module 3a by means of an integral hinge 12 in this case. The other holder module 3b is designed analogous thereto. The essential components of the holding device, namely the anchor plate 1, the two holder modules 3a and 3b, as well as the respectively assigned clamping blocks 5a', 5b', consist of plastic and are manufactured by means of injection moulding.

Figure 3:
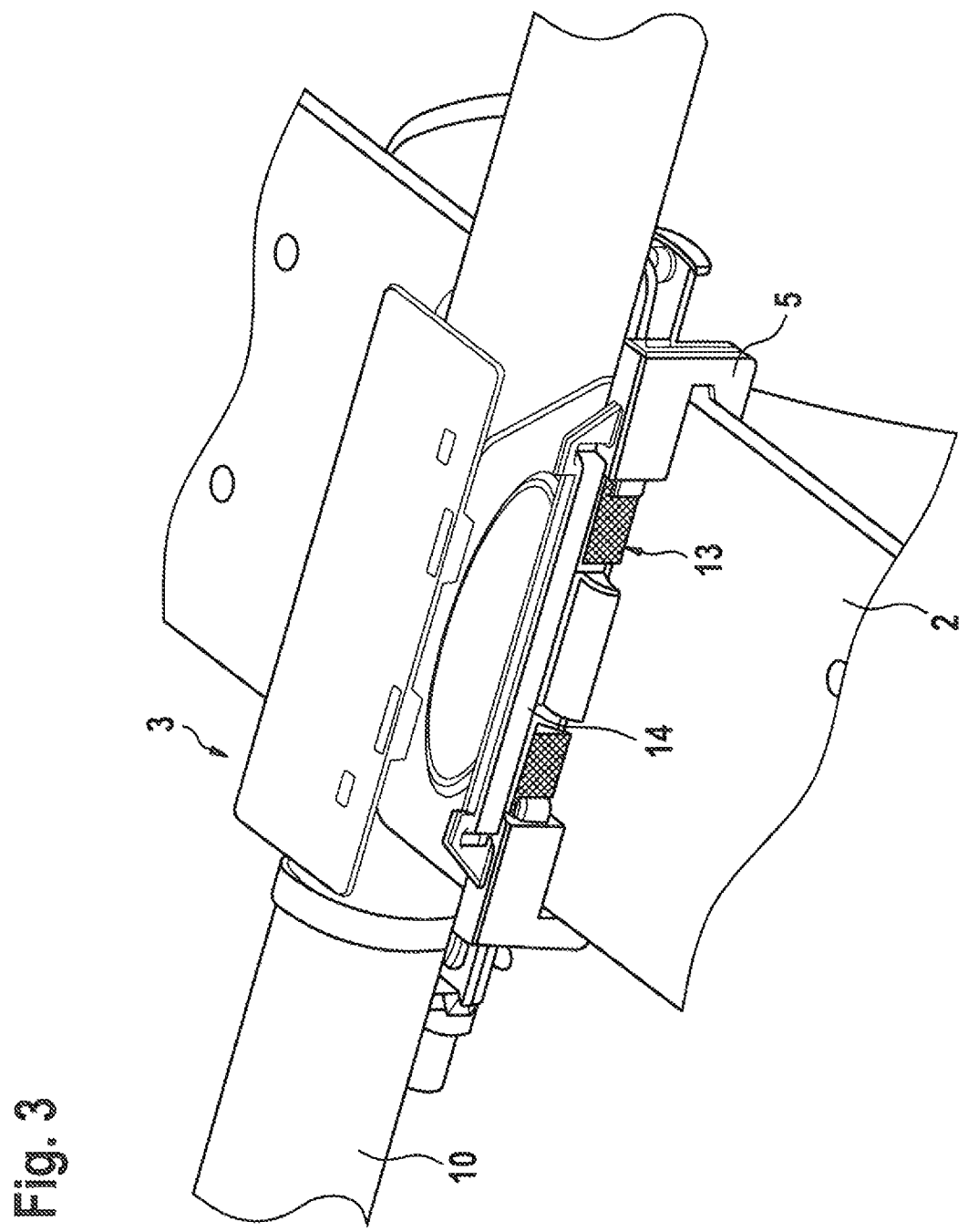
FIG. 3 shows a perspective view of a holding device with tensioning means according to a second embodiment.

In the other exemplary embodiment illustrated in FIG. 3, a holder module 3 is fixed (for example) by means of two clamping blocks 5 that are positively attached thereon and can be axially displaced in the clamping direction relative to the support rail 2, wherein a tensioning means in the form of a detent toothing 13 between the clamping block 5 and the holder module 3 secures the clamping block 5 against an unintentional movement in the opening direction. A tension strap 14 that connects the two clamping blocks 5 is used as additional securing means and realized in the form of a cable tie in this case.

Figure 4:
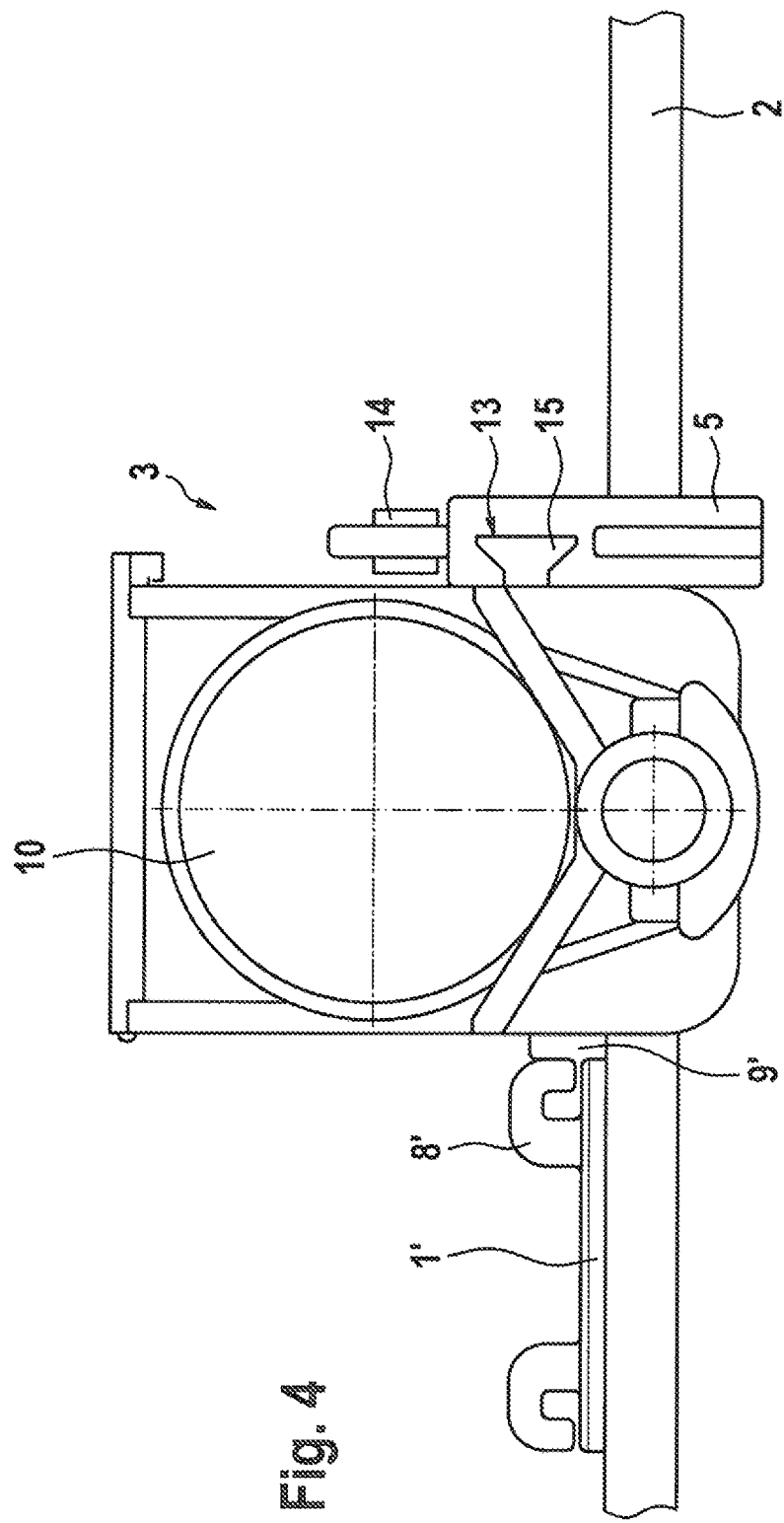
FIG. 4 shows a side view of the holding device of FIG. 3.

According to FIG. 4, the positive and axially guided connection between the clamping block 5 and the holder module 3 is realized (for example) by means of a guide rail 15 that is integrally formed thereon and has a dovetail profile. The detent toothing 13 is arranged on the surface of the guide rail 15.

On the opposite side of the holder module 3 referred to the clamping block 5, the holder module is fastened by means of an anchor plate 1' that is screwed to the support rail 2. For coupling purposes, the anchor plate 1' features an engagement section 8' that positively engages into a complimentary hook-like hook section 9' of the holder module 3.

As a supplement, it should be noted that "comprising" does not exclude other elements or steps, and that "an" or "a" does not exclude a plurality. It should furthermore be noted that characteristics or steps that were described with reference to one of the above exemplary embodiments can also be used in combination with other characteristics or steps of other above-described exemplary embodiments. Reference symbols in the claims should not be interpreted in a restrictive sense.

LIST OF REFERENCE SYMBOLS

1 Anchor plate
2 Support rail
3 Holder module
4 Tensioning screw
5 Clamping block
6 Nut
7 Recess
8 Engagement section
9 Hook section
10 Mounting part
11 Cover
12 Integral hinge
13 Detent toothing
14 Tension strap
15 Guide rail

What is claimed is:

1. A holding device for a mounting part installed inside an aircraft fuselage comprising:
    an anchor plate configured to attach the holding device to a support rail of the aircraft fuselage and including at least one engagement section;
    a holder module configured to fix the mounting part to the aircraft fuselage; the holder module including a hook section engaging the at least one engagement section of the anchor plate so as to separably fasten the holder module to the anchor plate;
    at least two clamping blocks disposed on the holder module and each having one of a contact surface and a recess, wherein the contact surface or recess of a first of the at least two clamping blocks faces a respective contact surface or recess of a second of the at least two clamping blocks; and
    a tensioning device operable to adjust the at least two clamping blocks so as to move the respective contact surface or recess of each of the at least two clamping blocks toward one another so as to fasten the holder module to the support rail,
    wherein, in an operational mode, the tensioning device presses the at least two clamping blocks against the support rail and an edge region of the support rail engages the contact surfaces or recesses of the at least two clamping blocks.

2. The holding device as recited in claim 1, wherein the tensioning device is a tensioning screw extending over a width of the support rail, and wherein the first of the at least two clamping blocks is disposed one an end of the support rail so as to fasten the clamping block to the support rail.

3. The holding device as recited in claim 2, wherein at least an end region of the tensioning screw includes a threaded section, and wherein a nut is screwed onto the threaded section so as to press the at least two clamping blocks against the support rail.

4. The holding device as recited in claim 1, further comprising a guide rail fixed on the holder module, and wherein the at least two clamping blocks are disposed on the holder module and configured to be connected to the guide rail and are axially movable in a clamping direction using a positively cooperating support on the guide rail, and wherein the tensioning device includes detent toothing configured to prevent an unintentional movement in an opening direction.

5. The holding device as recited in claim 4, wherein the tensioning device includes a tension strap connecting the at least two clamping blocks.

6. The holding device as recited in claim 1, wherein the recess of each of the at least two clamping blocks is wedge-shaped for an engagement on the edge region of the support rail.

7. The holding device as recited in claim 1, wherein the engagement section is one of pin-shaped and hook-shaped.

8. The holding device as recited in claim 1, further comprising a further holder module positively engaging one of the tensioning device and the hook section.

9. The holding device as recited in claim 1, wherein the anchor plate includes at least two screws configured to fasten the anchor plate on the support rail.

10. The holding device as recited in claim 1, wherein the holder module includes a U-shaped cross section having a channel-shaped receptacle configured to receive the mounting part.

11. The holding device as recited in claim 10, wherein the U-shaped holder module includes a channel closed with respect to a circumference of the channel in connection with a cover closeable via a clip-on connection.

12. A holding device for a mounting part installed inside an aircraft fuselage comprising:
    an anchor plate configured to attach the holding device to a support rail of the aircraft fuselage, the anchor plate including at least one engagement section;
    a holder module configured to fix the mounting part to the aircraft fuselage, the holder module including a hook section engaging the at least one engagement section of the anchor plate so as to separably fasten the holder module to the anchor plate;

at least two clamping blocks disposed on the holder module and each having one of a contact surface and a recess, wherein the contact surface or recess of a first of the at least two clamping blocks faces a respective contact surface or recess of a second of the at least two clamping blocks; and a tensioning device configured to adjust the at least two clamping blocks so as to move the respective contact surface or recess of each of the at least two clamping blocks toward one another so as to fasten the holder module to the support rail, wherein the holder module includes a U-shaped cross section having a channel-shaped receptacle configured to receive the mounting part, wherein the U-shaped holder module includes a channel closed with respect to a circumference of the channel in connection with a cover closeable via a clip-on connection, wherein the cover is coupled to the holder module using an integral hinge.

13. The holding device as recited in claim 1, wherein the mounting part is at least one of an electric cable harness and a fluidic conduit.

14. The holding device as recited in claim 1, wherein the anchor plate, the holder module, and the at least two clamping blocks include injection-molded plastic parts.

\* \* \* \* \*